United States Patent
Chopra et al.

(10) Patent No.: US 11,507,469 B2
(45) Date of Patent: Nov. 22, 2022

(54) METHOD AND SYSTEM FOR RISK SCORE BASED ASSET DATA PROTECTION USING A CONFORMAL FRAMEWORK

(71) Applicant: EMC IP Holding Company LLC, Hopkinton, MA (US)

(72) Inventors: Shelesh Chopra, Bangalore (IN); Mahantesh M. Ambaljeri, Bangalore (IN); Rahul Deo Vishwakarma, Bangalore (IN); Parmeshwr Prasad, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 51 days.

(21) Appl. No.: 17/131,508

(22) Filed: Dec. 22, 2020

(65) Prior Publication Data

US 2022/0197751 A1  Jun. 23, 2022

(51) Int. Cl.
*G06F 11/14* (2006.01)
*G06N 20/00* (2019.01)
*G06F 11/00* (2006.01)

(52) U.S. Cl.
CPC ........ *G06F 11/1451* (2013.01); *G06F 11/004* (2013.01); *G06N 20/00* (2019.01)

(58) Field of Classification Search
CPC .... G06F 11/1451; G06F 11/004; G06N 20/00
See application file for complete search history.

(56) References Cited

U.S. PATENT DOCUMENTS

| | | | | |
|---|---|---|---|---|
| 9,367,379 | B1* | 6/2016 | Burke | G06F 11/0793 |
| 10,331,524 | B2* | 6/2019 | Formato | G06F 11/1461 |
| 11,277,431 | B2* | 3/2022 | Trivellato | H04L 63/1433 |
| 2002/0143914 | A1* | 10/2002 | Cihula | H04L 41/0893 |
| | | | | 709/240 |

* cited by examiner

*Primary Examiner* — Nadeem Iqbal
(74) *Attorney, Agent, or Firm* — Chamberlain, Hrdlicka, White, Williams & Aughtry

(57) ABSTRACT

A method and system for risk score based asset data protection using a conformal framework. Concerning Internet-of-Things (IoT) environments, there is a growing challenge to ensure the availability and continuity of applications executing, as well as relevant application data maintained, on IoT devices, in order to mitigate potential operational failures and/or interruptions. The disclosed method and system address this growing challenge through risk-score assessments of the applications and their respective relevant application data (collectively referred to as assets), as well as the potential degradation of the underlying IoT device hardware. The aforementioned risk-score assessments employ clustering to identify, and a conformal framework to rank, high-risk (for failure) assets, which may subsequently be subjected to backup operations (overriding existing policies) to guarantee asset protection.

20 Claims, 3 Drawing Sheets

METHOD AND SYSTEM FOR RISK SCORE BASED ASSET DATA PROTECTION USING A CONFORMAL FRAMEWORK

BACKGROUND

Concerning Internet-of-Things (IoT) environments, there is a growing challenge to ensure the availability and continuity of applications executing, as well as relevant application data maintained, on IoT devices, in order to mitigate potential operational failures and/or interruptions.

SUMMARY

In general, in one aspect, the invention relates to a method for asset data protection. The method includes identifying a set of assets hosted across a host device cluster including a set of host devices, ranking, in descending order and to obtain a ranked subset of assets, a subset of the set of assets based on a risk score calculated for each asset in the subset of the set of assets, identifying at least one failure-soon asset from the ranked subset of assets, and performing, while overriding any existing data protection policy configured thereto, a backup operation targeting the at least one failure-soon asset, wherein the risk score calculated for each asset in the subset of the set of assets is provided using a conformal framework.

In general, in one aspect, the invention relates to a non-transitory computer readable medium (CRM). The non-transitory CRM includes computer readable program code, which when executed by a computer processor, enables the computer processor to identify a set of assets hosted across a host device cluster including a set of host devices, rank, in descending order and to obtain a ranked subset of assets, a subset of the set of assets based on a risk score calculated for each asset in the subset of the set of assets, identify at least one failure-soon asset from the ranked subset of assets, and perform, while overriding any existing data protection policy configured thereto, a backup operation targeting the at least one failure-soon asset, wherein the risk score calculated for each asset in the subset of the set of assets is provided using a conformal framework.

Other aspects of the invention will be apparent from the following description and the appended claims.

DETAILED DESCRIPTION

Figure 1:
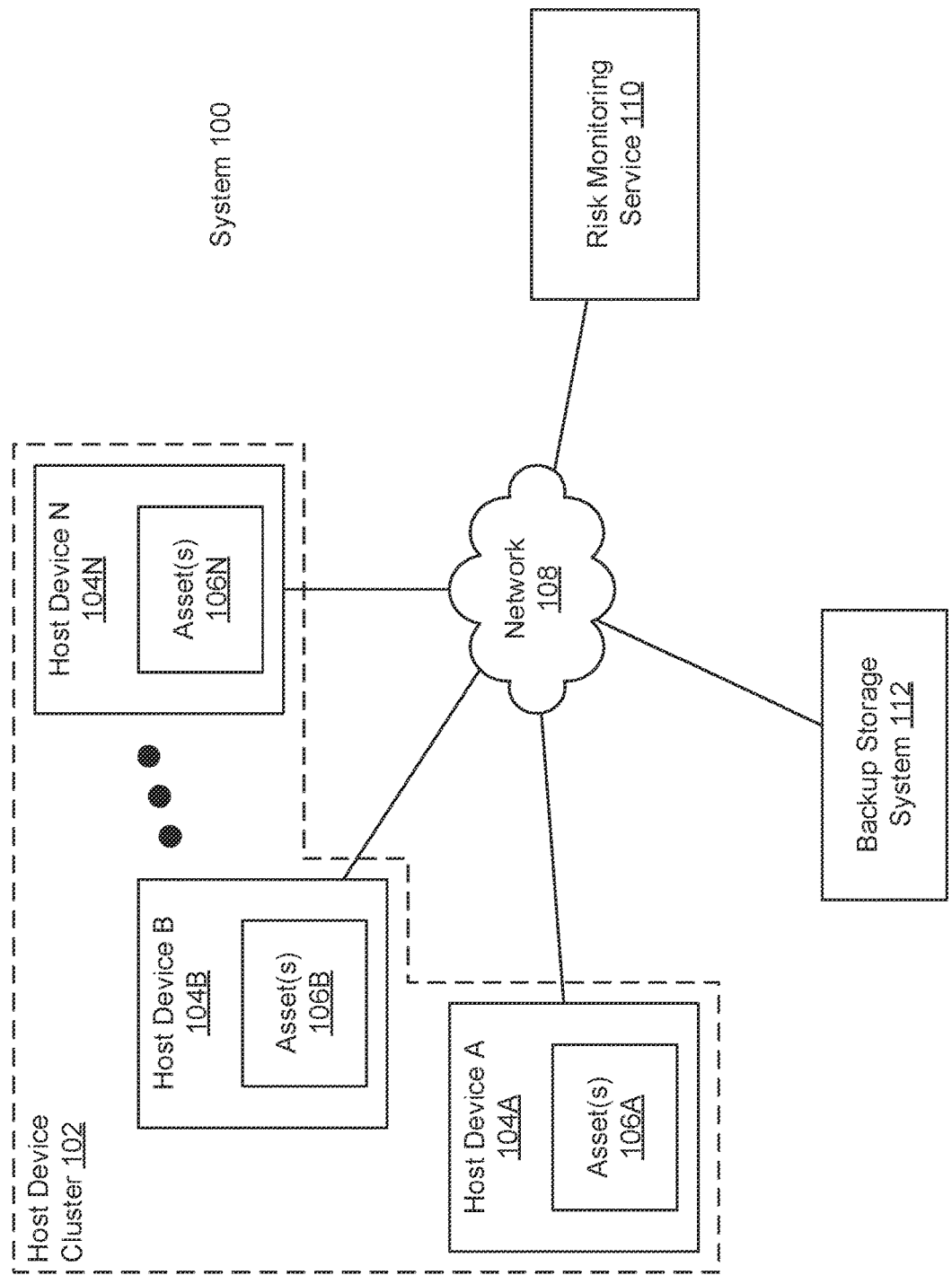
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-3, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for risk score based asset data protection using a conformal framework. Concerning Internet-of-Things (IoT) environments, there is a growing challenge to ensure the availability and continuity of applications executing, as well as relevant application data maintained, on IoT devices, in order to mitigate potential operational failures and/or interruptions. The disclosed method and system address this growing challenge through risk-score assessments of the applications and their respective relevant application data (collectively referred to as assets), as well as the potential degradation of the underlying IoT device hardware. The aforementioned risk-score assessments employ clustering to identify, and a conformal framework to rank, high-risk (for failure) assets, which may subsequently be subjected to backup operations (overriding existing policies) to guarantee asset protection.

FIG. 1 shows a system in accordance with one or more embodiments of the invention. The system (100) may include a host device cluster (102) operatively connected to a risk monitoring service (110) and a backup storage system (112) through a network (108). Each of these system (100) components is described below.

In one embodiment of the invention, the host device cluster (102) may represent a collection of host devices (104A-104N). In turn, each host device (104A-104N) may represent any physical appliance or computing system configured to receive, generate, process, and/or transmit data, as well as to provide an environment in which one or more assets (106A-106N) (described below) may execute thereon. In providing an execution environment for the asset(s) (106A-106N) running thereon, any host device (104A-104N) may include and allocate various resources (e.g., computer processors, memory, storage, virtualization, networking, etc.), as needed, for the asset(s) (106A-106N) to consume. One of ordinary skill will appreciate that any host device (104A-104N) may perform other functionalities without departing from the scope of the invention. By way of examples, a host device (104A-104N) may be implemented as an Internet-of-Things (IoT) device, a server, or any other computing system similar to the exemplary computing system shown in FIG. 3.

In one embodiment of the invention, an asset (106A-106N) (also referred to as a workload) may refer to an allocation of host device (104A-104N) resources (exemplified above) as well as computer readable program code and relevant data, which may collectively support a defined process, such as a guest operating system, an application, or a service offered locally or over the network (108). Examples of an asset (106A-106N) may include, but are not limited to, a virtual machine, a container, a database, and a collection of micro-services.

In one embodiment of the invention, the risk monitoring service (110) may represent IoT (and/or information technology (IT)) infrastructure configured for asset (106A-106N), as well as host device (104A-104N), monitoring, performance data collection, and failure risk assessment. To that extent, the risk monitoring service (110) may include functionality to at least perform the method, for risk score based asset data protection using a conformal framework, outlined in FIG. 2, below. Further, the risk monitoring service (110) may be implemented using, or on, an IoT base station (and/or an IT physical server residing in a datacenter or an IT virtual server residing in a cloud computing environment). Alternatively, the risk monitoring service (110) may be implemented using, or on, a computing system similar to the exemplary computing system shown in FIG. 3.

In one embodiment of the invention, the backup storage system (112) may represent a data backup, archiving, and/or disaster recovery storage system for protecting asset (106A-106N) relevant data. The backup storage system (112) may be implemented using one or more servers (not shown). Each server may refer to a physical or virtual server, which may reside in a datacenter or a cloud computing environment. Additionally, or alternatively, the backup storage system (112) may be implemented using one or more computing systems similar to the exemplary computing system shown in FIG. 3. Furthermore, the backup storage system (112) may include, but is not limited to, a collection of one or more physical or virtual storage devices on which protected asset (106A-106N) relevant data may be consolidated. Each storage device (not shown) may encompass non-transitory computer readable storage media on which data may be stored in whole or in part, and temporarily or permanently. Further, each storage device may be designed and configured based on any existing storage device technology—examples of which may include, but are not limited to, flash based storage device technology, fibre-channel (FC) based storage device technology, serial-attached small computer system interface (SCSI) (SAS) based storage device technology, and serial advanced technology attachment (SATA) storage device technology. Moreover, any subset or all of each storage device may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the above-mentioned system (100) components (or subcomponents thereof) may communicate with one another through the network (108) (e.g., a local area network (LAN), a wide area network (WAN) such as the Internet, a mobile network, any other network type, or a combination thereof). The network (108) may be implemented using any combination of wired and/or wireless connections. Further, the network (108) may encompass various interconnected, network-enabled subcomponents (or systems) (e.g., switches, routers, etc.) that may facilitate communications between the above-mentioned system (100) components. Moreover, in communicating with one another, the above-mentioned system (100) components (or subcomponents thereof) may employ any combination of wired and/or wireless communication protocols.

While FIG. 1 shows a configuration of components, other system (100) configurations may be used without departing from the scope of the invention.

Figure 2:
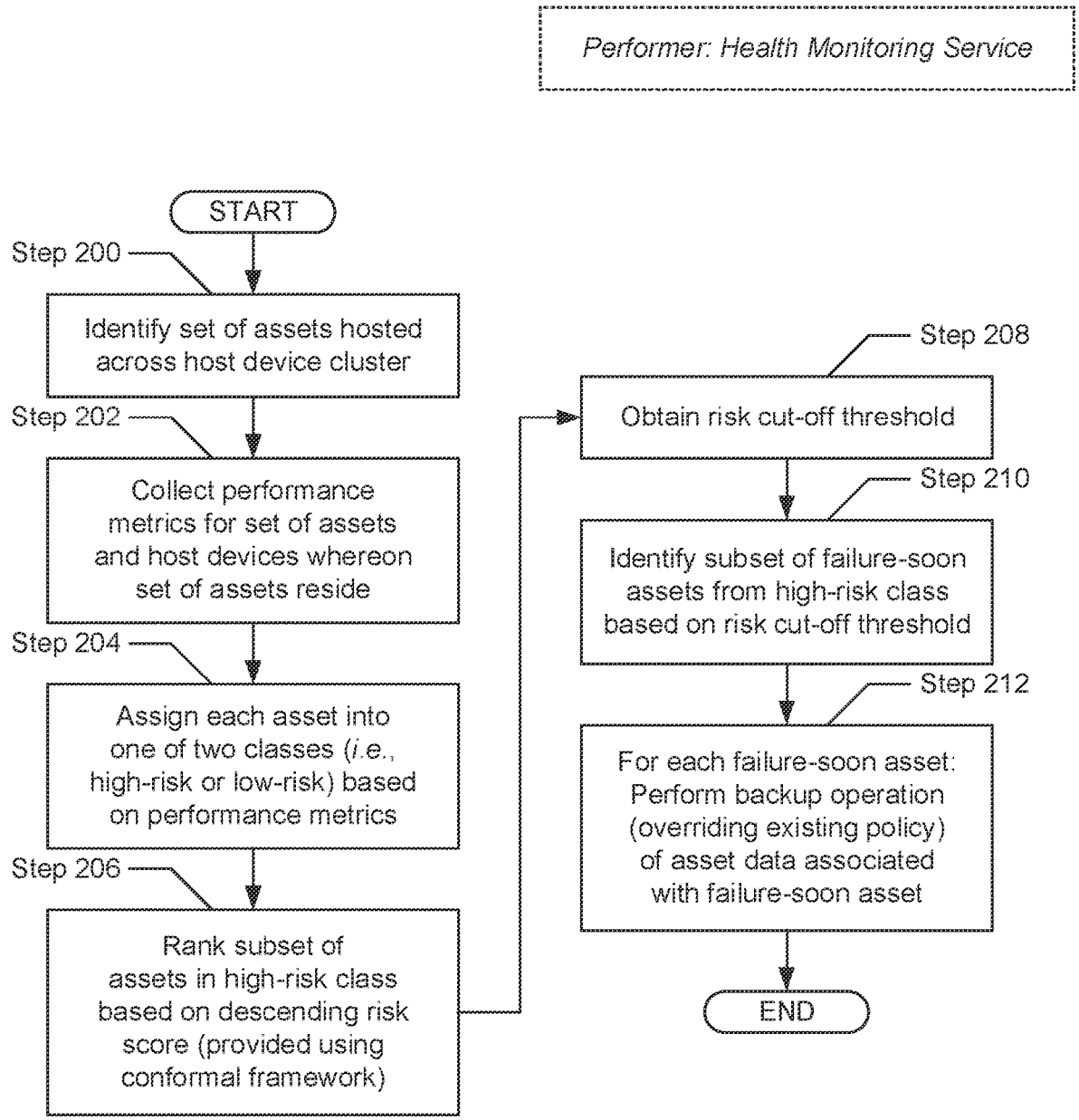
FIG. 2 shows a flowchart describing a method for risk score based asset data protection using a conformal framework in accordance with one or more embodiments of the invention.

FIG. 2 shows a flowchart describing a method for risk score based asset data protection using a conformal framework in accordance with one or more embodiments of the invention. The various steps outlined below may be performed by the risk monitoring service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a set of assets, hosted across a host device cluster (see e.g., FIG. 1), is identified. In one embodiment of the invention, the host device cluster may represent a collection of host devices—each of which may be implemented, for example, as an Internet-of-Things (IoT) device, a server, or any other computing system similar to the exemplary computing system shown in FIG. 3. Further, each asset may refer to an allocation of host device resources (e.g., computer processors, memory, storage, virtualization, networking, etc.), as well as computer readable program code and relevant data, which may collectively support a defined process, such as a guest operating system, an application, or a service offered locally or over a network. Examples of an asset may include, but are not limited to, a virtual machine, a container, a database, and a collection of micro-services.

In Step 202, performance metrics, for each asset in the set of assets (identified in Step 200), as well as for the respective host device where each asset operates, are collected. In one embodiment of the invention, each performance metric may serve as a real-time or historical (i.e., over-time) indicator for: how well any asset or their hosting host device may be performing, and what issues may be impacting the performance of any asset or their hosting host device. Examples of these performance metrics may include, but are not limited to: asset downtime (i.e., number of times the asset has gone down in a given time period); host device boot time (i.e., length of time taken to boot the hosting host device); CPU utilization (i.e., percentage of total computer processor usage by the asset); CPU ready time (i.e., average length of time the asset waits to be scheduled onto a physical CPU core); CPU idle time (i.e., average length of time the physical computer processor core(s) of the hosting host device remains in an idle state); active memory utilization (i.e., percentage of total computer memory usage by the asset); kernel memory utilization (i.e., percentage of total computer memory usage by the asset kernel); disk read latency (i.e., average length of time taken for the asset to read from a data store); disk write latency (i.e., average length of time taken for the asset to write to a data store); network utilization (i.e., rate at which data transmitted and received across all physical and/or virtual network adapters connected to the asset); CPU downtime (i.e., number of computer processor cores that have gone down in a given period of time); and memory downtime (i.e., number of computer memory partitions that have failed in a given period of time). One of ordinary skill will appreciate that additional or alternative performance metrics may be used without departing from the scope of the invention.

In Step 204, based on the performance metrics (collected in Step 202), each asset in the set of assets (identified in Step 200) is assigned into one of two classes —i.e., a high-risk class or a low-risk class. In one embodiment of the invention, assignment of an asset into one of the aforementioned classes (versus the other) may rely on the clustering (or grouping) of features (e.g., performance metrics), pertinent to the asset, within N-dimensional feature space. Clustering (also referred to as cluster analysis) may refer to an unsupervised machine learning classification technique predominantly used to classify objects (e.g., the set of assets) into relative groups (or clusters). Through clustering, objects placed within a same group are determined to be more similar to each other (based on their features) than to those objects placed within other groups. Accordingly, based on their respective performance metrics, each asset may be deduced to have a relatively high-risk for failure (i.e., placed within the high-risk class or group of assets) or a relatively low-risk for failure (i.e., placed within the low-risk class or group of assets).

In Step 206, the subset of assets (assigned in Step 204) within the high-risk class is/are ranked, in descending order, based on their respective risk score. In one embodiment of the invention, the risk score for any given asset may be determined through a conformal framework. The conformal framework may refer to an algorithm-agnostic scheme (i.e., a scheme that can be implemented on or applied over any machine learning algorithm) that associates a reliable measure of confidence with any prediction or classification output derived by any machine learning algorithm. Accordingly, in the instant case of asset classification via clustering, the conformal framework may be applied there-over in order to calculate a confidence value associated with the class within which the asset had been assigned. That is, for a given asset assigned to a given class, the confidence value, provided by the conformal framework, may reflect a mathematically calculated likelihood that the assignment associating the given asset to the given class is reliable or correct. The risk score of any given asset may therefore be synonymous with the confidence value, calculated via the conformal framework, associated with assignment of the given asset into a given class—i.e., the high-risk class. Implementation of the conformal framework may employ any existing conformal framework method (e.g., transductive, inductive, density-based, etc.).

In Step 208, a risk cut-off threshold is obtained. In one embodiment of the invention, the risk cut-off threshold may reflect a risk score (or confidence measurement) value, which may be configured by an administrator of the host device cluster. Thereafter, in Step 210, based on the risk cut-off threshold (obtained in Step 208), one or more assets of the above-mentioned high-risk class is/are identified as failure-soon asset(s), thereby obtaining a subset of failure-soon assets. In one embodiment of the invention, any given failure-soon asset may refer to an asset associated with a highest likelihood to experience a prospective failure soon (or within a relatively short period of time). Furthermore, any given failure-soon asset may refer to an asset reflecting a risk score that matches or exceeds the risk cut-off threshold.

In Step 212, a backup operation is subsequently performed for each asset in the subset of failure-soon assets (obtained in Step 210). In one embodiment of the invention, each respective backup operation, for a given failure-soon asset, may entail the replication, and storage, of any configuration information, computer readable program code, and/or data relevant or pertinent to the given failure-soon asset, or the defined process associated therewith. Further, each respective backup operation, for a given failure-soon asset, may override any existing data protection schedule or policy configured for the given failure-soon asset.

Figure 3:
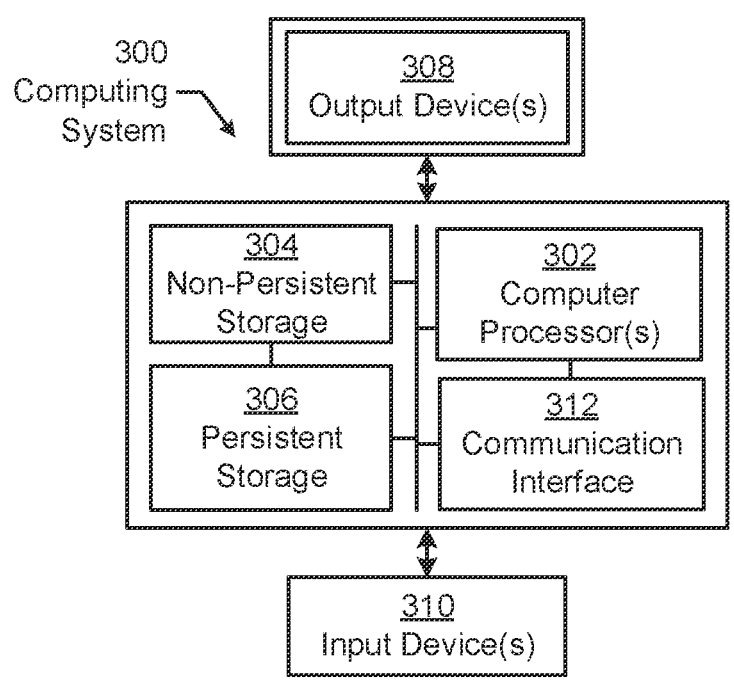
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for asset data protection, comprising:
identifying a set of assets hosted across a host device cluster comprising a set of host devices;
ranking, in descending order and to obtain a ranked subset of assets, a subset of the set of assets based on a risk score calculated for each asset in the subset of the set of assets;
identifying at least one failure-soon asset from the ranked subset of assets; and
performing, while overriding any existing data protection policy configured thereto, a backup operation targeting the at least one failure-soon asset,
wherein the risk score calculated for each asset in the subset of the set of assets is provided using a conformal framework.

2. The method of claim 1, further comprising:
prior to ranking the subset of the set of assets:
collecting performance metrics for each asset in the set of assets; and
assigning, based on the performance metrics, each asset in the set of assets to one selected from a group consisting of a high-risk class and a low-risk class,
wherein each asset in the ranked subset of assets is a member of the high-risk class.

3. The method of claim 2, wherein assignment of each asset in the set of assets, to one selected from the group consisting of the high-risk class and the low-risk class, resulted from machine learning classification performed through cluster analysis.

4. The method of claim 2, wherein the conformal framework associates a confidence value with each assignment mapping an asset in the subset of the set of assets to the high-risk class.

5. The method of claim 4, wherein the risk score, calculated for each asset in the subset of the set of assets, comprises the confidence value associated with the assignment mapping the asset to the high-risk class.

6. The method of claim 2, wherein performance metrics for a respective host device, in the set of host devices, on which each asset in the set of assets resides, are also collected.

7. The method of claim 2, wherein the at least one failure-soon asset is identified from assets of the high-risk class based on a risk cut-off threshold.

8. The method of claim 7, wherein the risk score of each failure-soon asset of the at least one failure-soon asset at least matches the risk cut-off threshold.

9. The method of claim 1, wherein performing the backup operation targeting the at least one failure-soon asset comprises storing at least one selected from a group consisting of configuration information, computer code, and data, pertinent to the at least one failure-soon asset onto a backup storage system.

10. The method of claim 1, wherein each host device in the set of host devices is an Internet-of-Things (IoT) device.

11. A non-transitory computer readable medium (CRM) comprising computer readable program code, which when executed by a computer processor, enables the computer processor to:
identify a set of assets hosted across a host device cluster comprising a set of host devices;
rank, in descending order and to obtain a ranked subset of assets, a subset of the set of assets based on a risk score calculated for each asset in the subset of the set of assets;
identify at least one failure-soon asset from the ranked subset of assets; and
perform, while overriding any existing data protection policy configured thereto, a backup operation targeting the at least one failure-soon asset,
wherein the risk score calculated for each asset in the subset of the set of assets is provided using a conformal framework.

12. The non-transitory CRM of claim 11, further comprising computer readable program code, which when executed by the computer processor, further enables the computer processor to:
prior to ranking the subset of the set of assets:
collect performance metrics for each asset in the set of assets; and
assign, based on the performance metrics, each asset in the set of assets to one selected from a group consisting of a high-risk class and a low-risk class,
wherein each asset in the ranked subset of assets is a member of the high-risk class.

13. The non-transitory CRM of claim 12, wherein assignment of each asset in the set of assets, to one selected from the group consisting of the high-risk class and the low-risk class, resulted from machine learning classification performed through cluster analysis.

14. The non-transitory CRM of claim 12, wherein the conformal framework associates a confidence value with each assignment mapping an asset in the subset of the set of assets to the high-risk class.

15. The non-transitory CRM of claim 13, wherein the risk score, calculated for each asset in the subset of the set of assets, comprises the confidence value associated with the assignment mapping the asset to the high-risk class.

16. The non-transitory CRM of claim 12, wherein performance metrics for a respective host device, in the set of host devices, on which each asset in the set of assets resides, are also collected.

17. The non-transitory CRM of claim 12, wherein the at least one failure-soon asset is identified from assets of the high-risk class based on a risk cut-off threshold.

18. The non-transitory CRM of claim 17, wherein the risk score of each failure-soon asset of the at least one failure-soon asset at least matches the risk cut-off threshold.

19. The non-transitory CRM of claim 11, wherein performing the backup operation targeting the at least one failure-soon asset comprises storing at least one selected from a group consisting of configuration information, computer code, and data, pertinent to the at least one failure-soon asset onto a backup storage system.

20. The non-transitory CRM of claim 11, wherein each host device in the set of host devices is an Internet-of-Things (IoT) device.

* * * * *